United States Patent
Drake

(10) Patent No.: US 7,040,280 B1
(45) Date of Patent: May 9, 2006

(54) SPARK IGNITION ENHANCER AND SPARK PLUG THEREWITH

(75) Inventor: Michael C. Drake, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 11/053,555

(22) Filed: Feb. 8, 2005

(51) Int. Cl.
*F02B 3/00* (2006.01)

(52) U.S. Cl. ..................................................... 123/298
(58) Field of Classification Search ............... 123/298, 123/295, 305, 300
See application file for complete search history.

(56) References Cited

U.S. PATENT DOCUMENTS

| | | | | |
|---|---|---|---|---|
| 1,260,408 A | * | 3/1918 | Leissner | 123/251 |
| 4,413,606 A | * | 11/1983 | Klak et al. | 123/550 |
| 4,480,613 A | * | 11/1984 | Siewert | 123/298 |
| 5,245,963 A | * | 9/1993 | Sabol et al. | 123/266 |
| 5,522,357 A | * | 6/1996 | Nogi et al. | 123/261 |
| 5,720,252 A | * | 2/1998 | Blodgett et al. | 123/298 |
| 6,227,164 B1 | * | 5/2001 | Miller | 123/298 |

\* cited by examiner

*Primary Examiner*—Mahmoud Gimie
(74) *Attorney, Agent, or Firm*—Kathryn A. Marra

(57) ABSTRACT

A spark ignition enhancer is provided in a combustion chamber of a spark ignition direct injection engine. The combustion chamber includes a fuel injector operable to spray a fuel plume into the chamber near a spark gap. The ignition enhancer includes a diversion element that extends into the fuel plume, between the fuel injector and the spark gap, to divert some of the fuel spray toward the spark gap to provide a spark ignitable air-fuel mixture at the spark gap, located outside of the spray plume. The diversion element may be mounted on a spark plug or on an adjacent element. The ignition enhancer improves ignitability by breaking up droplets in the spray plume, enhancing fuel vaporization, and diverting some fuel vapor to a spark gap outside the spray plume or away from a spark gap in the spray plume, so that liquid fuel at the gap is reduced, small scale turbulence is increased and gradients in fuel vapor distribution at the gap are reduced.

3 Claims, 7 Drawing Sheets

SPARK IGNITION ENHANCER AND SPARK PLUG THEREWITH

TECHNICAL FIELD

This invention relates to spark ignition direct injection engines and, more particularly, to a spark ignition enhancer for altering the spray path of injected fuel within a combustion chamber to improve fuel ignitability at a spark gap portion of a spark plug.

BACKGROUND OF THE INVENTION

Location of a spark gap of a conventional spark plug in line with a direct injection fuel spray plume results in intermittent misfires under some operating conditions. Means for reducing misfires and enhancing ignition consistency are needed.

SUMMARY OF THE INVENTION

The present invention provides a spark ignition enhancer in a spark ignition direct injection engine combustion chamber. A spark plug spark gap is located out of the direct spray plume and a mechanical diversion element is added to divert some of the fuel spray to provide a spark ignitable air-fuel mixture at the spark gap. The diversion element may also increase fuel spray turbulence and improve fuel vaporization around the spark gap. The diversion element may be carried on a spark plug to provide an ignition enhancing spark plug.

In a first exemplary embodiment, the spark ignition enhancer is carried on a spark plug having an axially extending body with a central insulated electrode extending from a first end. A ground electrode extends from a peripheral edge of the first end, proximate the insulated electrode. A spark gap is formed between the electrodes and is positioned in or near a direct fuel spray path or fuel plume. A mechanical diversion element (spark ignition enhancer) in the form of a metal mesh member or screen extends from the first end of the body and is positioned to shelter the electrodes and the spark gap from direct fuel spray. Fuel hitting the screen is partially deflected toward from the spark gap, or away from it, to assist formation of an ignitable air-fuel mixture at the spark gap. The screen may also improve vaporization of fuel ahead of the spark gap and create turbulence in the spark gap. The remainder of the fuel is dispersed as it passes through the openings of the screen. This reduces the velocity of the fuel cloud, reduces the size of the fuel droplets, improves fuel vaporization and reduces the gradient of fuel concentration near the spark gap. As a result, the chance of a misfire is reduced and the fuel near the spark gap easily ignites.

In another exemplary embodiment, a spark ignition enhancer is integrated into an extended ground electrode and a bent center electrode of a spark plug. The ground electrode extends past a point proximate to the central electrode to define a spark gap between the electrodes, which is located out of a direct fuel spray path. The ground electrode forms a mechanical diversion element (spark ignition enhancer) that extends further into a fuel spray path to direct a portion of the fuel spray toward the spark gap of the plug to provide an ignitable mixture at the spark gap. It also creates turbulence as the injected fuel passes near the spark gap. This increases fuel vaporization and reduces the velocity of the injected fuel to improve the fuel-air mixture.

In yet another exemplary embodiment, a spark ignition enhancer is integrated into a ground electrode of a spark plug. The spark plug includes an axially extending body having a central insulated electrode extending from a first end. An end portion of the central insulated electrode extends radially toward the ground electrode extending from a peripheral edge of the first end of the spark plug body to define a radially extending spark gap between the end portion of the central electrode and an axially extending portion of the ground electrode. The spark gap is positioned outside of a fuel spray path. An end portion of the ground electrode forms a mechanical diversion element (spark ignition enhancer) that extends into a fuel spray path. This creates turbulence in the fuel spray to improve fuel vaporization and reduce the velocity of the injected fuel to improve the fuel-air mixture. In addition, the shape of the ground electrode deflects a portion of the improved fuel-air mixture toward the spark gap of the plug.

These and other features and advantages of the invention will be more fully understood from the following description of certain specific embodiments of the invention taken together with the accompanying drawings.

DESCRIPTION OF THE PREFERRED EMBODIMENT

Figure 1:
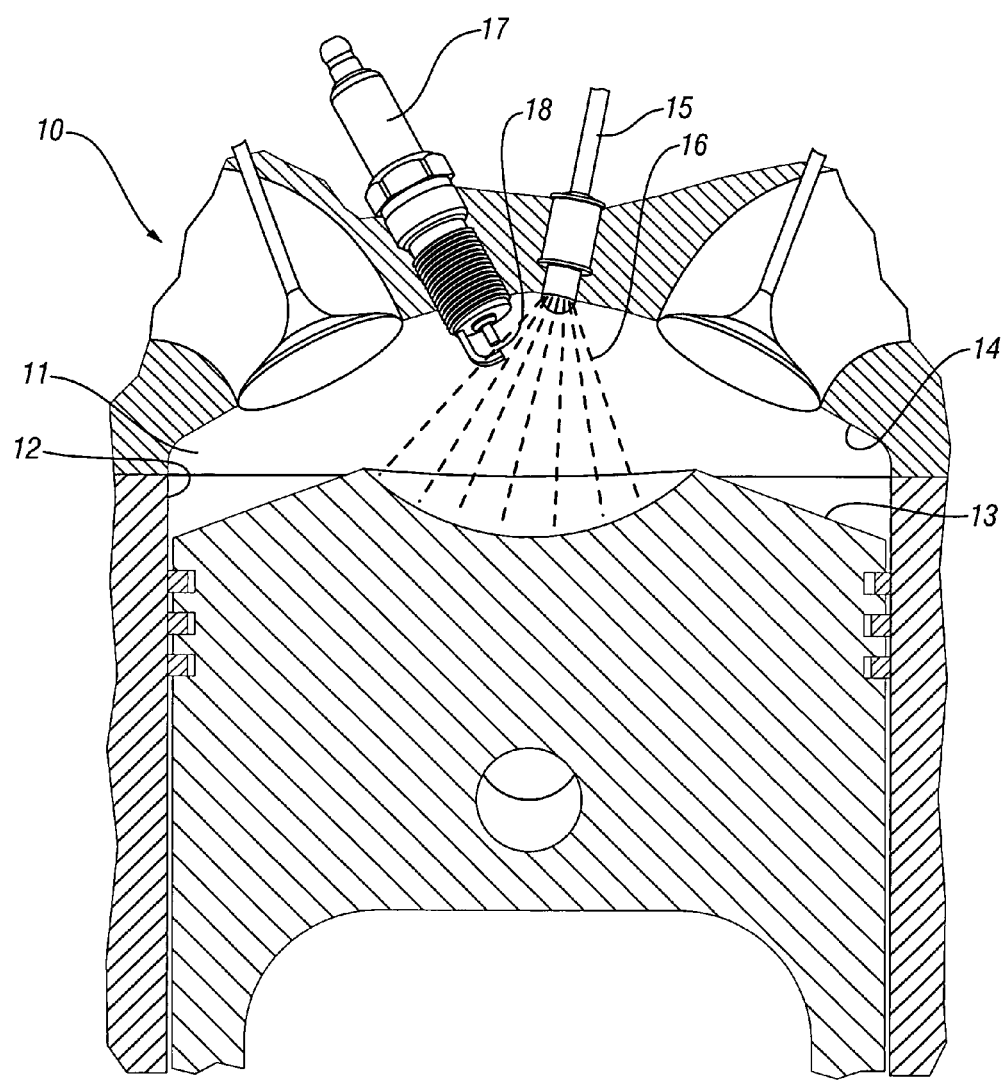
FIG. 1 is a cross-sectional view through a combustion chamber of a spark ignition direct injection internal combustion engine.

Referring first to FIG. 1 of the drawings in detail, numeral 10 generally indicates a spark ignition direct injection internal combustion engine including a combustion chamber 11. The combustion chamber 11 is defined by a cylinder 12, a piston 13 reciprocable in the cylinder and a cylinder head 14 closing an end of the cylinder. A fuel injector 15 extends through the cylinder head 12 and operates to spray fuel into the combustion chamber 11 in a cone-like fuel spray plume 16, which may be formed by multiple streams of atomized fuel droplets.

A spark plug 17 is positioned a distance to one side of the fuel injector and includes a spark gap 18 located at one edge of the spray plume 16. In accordance with the present invention, the spark plug may be modified to provide various forms of ignition enhancers operative to increase the ignitability of air-fuel mixture in the spark gap at the time of ignition of a cylinder air-fuel charge.

Figure 2:
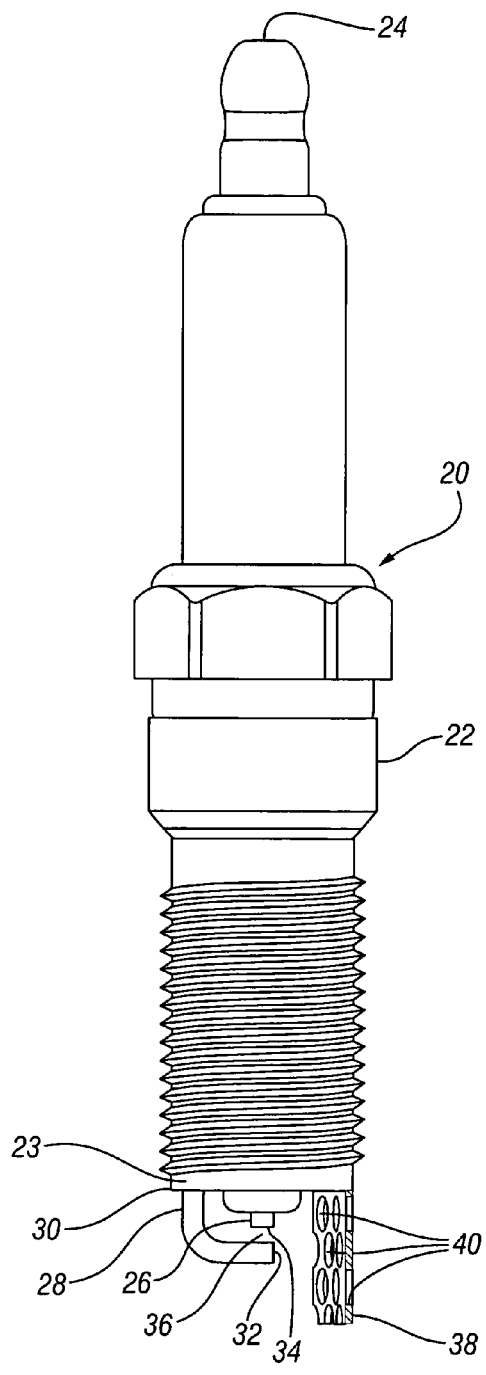
FIG. 2 is a side view of a spark plug having a spark ignition enhancer according to a first embodiment of the present invention.
Figure 3:
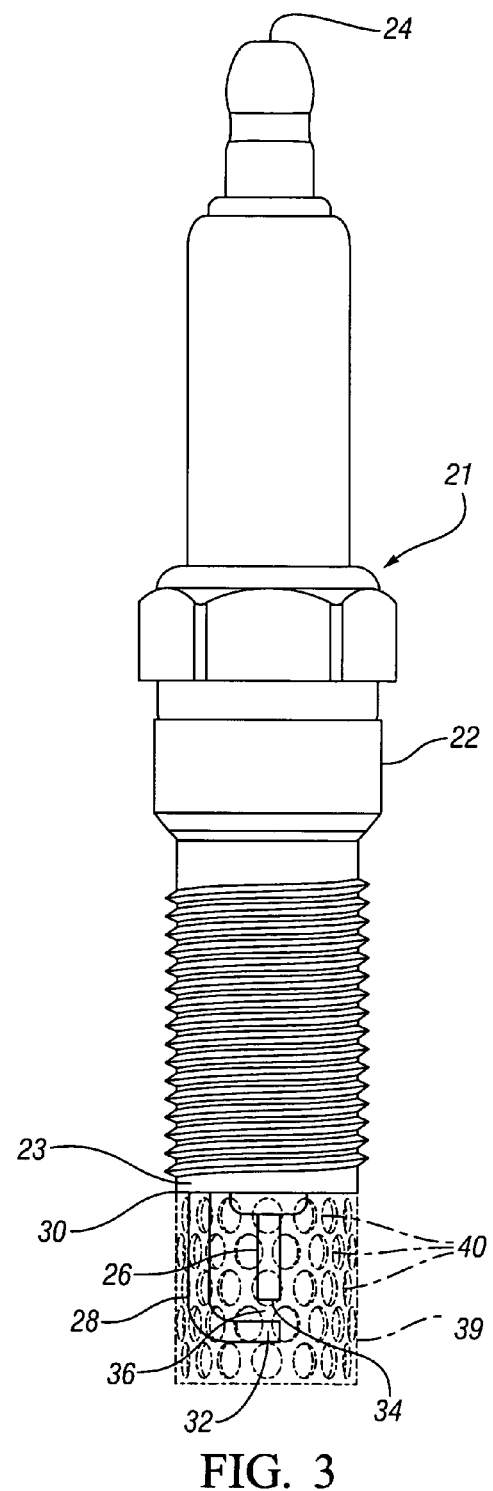
FIG. 3 is a side view showing a variation of the spark plug of FIG. 2.

Referring to FIGS. 2 and 3 of the drawings, there are shown spark plugs 20, 21 illustrating two variations of a first embodiment of the invention. The spark plugs each include an axially extending body 22 having a first end 23 adapted to extend into a combustion chamber and a second end 24 adapted to extend outside the chamber. An insulated central electrode 26 extends from the first end 23 to the second end 24 for connection with an electrical ignition power source, not shown. A ground electrode 28 extends from a peripheral edge 30 of the first end, radially adjacent to the central electrode 26, to an end 32 of the ground electrode, axially spaced from an opposite surface 34 of the central electrode, to define an axially extending spark gap 36. In FIG. 2, the electrodes are made short enough to be out of the path of direct fuel spray of the fuel plume 16 in the combustion chamber. In FIG. 3, are made longer so they would lie in the path of the fuel plume.

In both FIGS. 2 and 3, a mechanical diversion element (spark ignition enhancer), in the form of a perforate metal screen 38 or 39 is carried on the first end 23 of the spark plug body 22 and partially or fully surrounds the spark gap 36. The screen may take any desired form, such as a rigid metal mesh or a perforated sheet, as shown in the drawings. The screen extends beyond the spark gap 36 and into the fuel plume 16, when the plug is installed in an engine combustion chamber 11. In FIG. 2, the screen 38 partially surrounds the gap along one side of the first end. This requires locating the plug, when installed, with the screen 38 in a position between the fuel injector and the spark gap. In FIG. 3, the screen 39 is a cylindrical perforate sheet and extends completely around the first end 23 so that the screen is between the fuel injector 15 and the spark gap 36 in any position of the spark plug.

The screen may be formed of Ni-alloy or any other suitable electrode material. The size of the screen 38 or 39 should adequate to extend into the fuel injector spray plume to divert some of the fuel-air mixture to the spark plug gap 36, as shown in FIG. 2, or away from the spark plug gap, as shown in FIG. 3. Openings 40 in the screens are sized to control the amount of fuel directed to or from the spark gap 32 of the plug 20 and to improve fuel atomization and vaporization for improved fuel ignitability.

Figure 4:
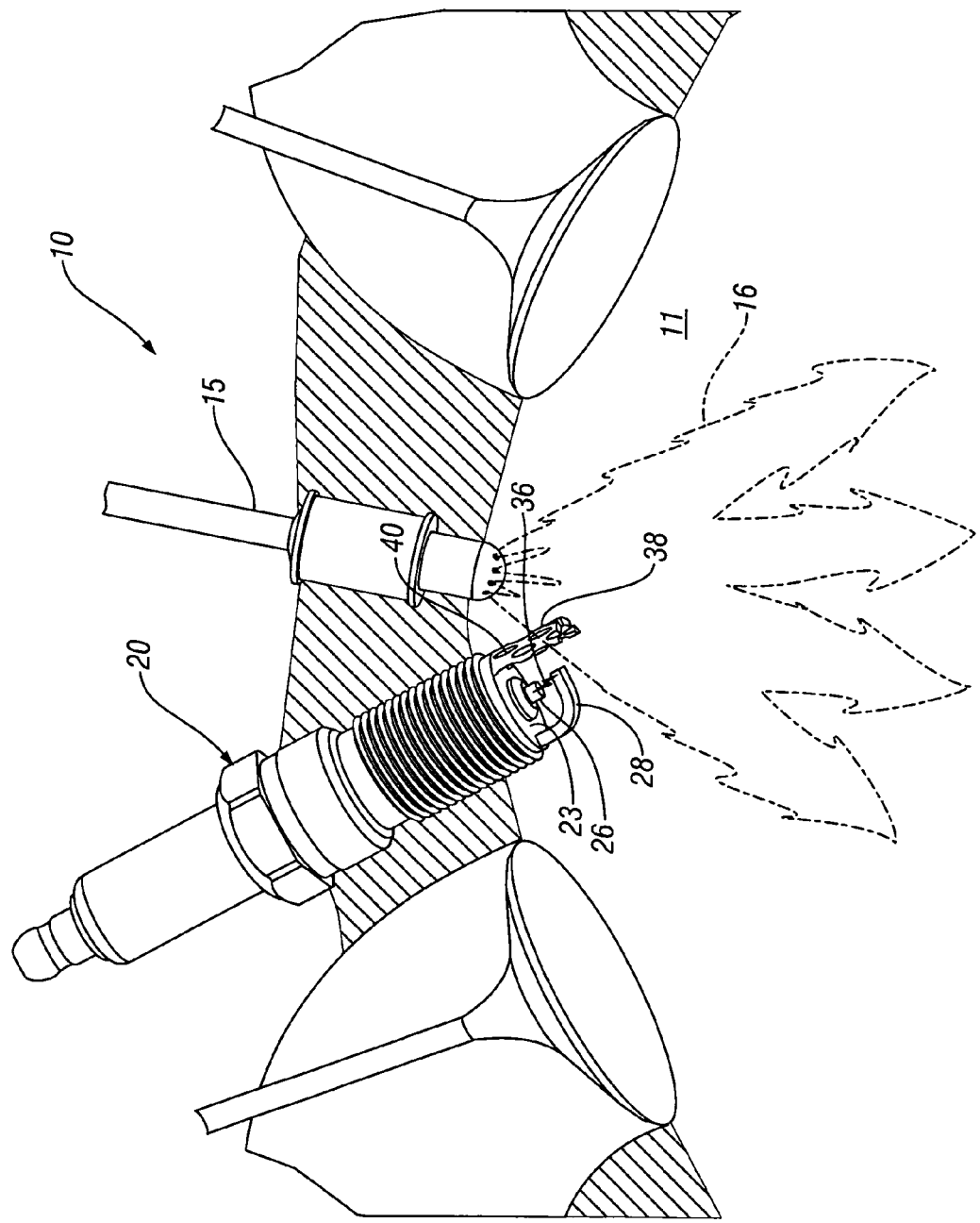
FIG. 4 is a cross-sectional pictorial view showing a fuel spray plume in a combustion chamber with the spark plug of FIG. 2.

As illustrated in FIG. 4, showing use of the spark plug 20 of FIG. 2, fuel is sprayed as a fuel plume 16 from the injector 15 into the combustion chamber 11 and toward the screen 38. As the fuel contacts the screen 38, a portion of the fuel is deflected, creating turbulence which improves fuel vaporization by mixing the fuel with air present in the combustion chamber 11. Some of the fuel passing through the openings 40 in the screen 38 is deflected toward the spark gap 36.

As the fuel passes through the openings 40, fuel droplets are broken down into smaller droplets by the turbulence and/or the edges of the openings, improving fuel atomization. This also promotes fuel vaporization and reduces the velocity of the fuel deflected toward the spark gap 36 of the spark plug 20. As a result, when the spark plug 20 is energized to form an arc in the spark gap 36, the improved fuel mixture at the spark gap easily ignites. This in turn ignites air-fuel mixture throughout the combustion chamber 11 for improved combustion and reduced likelihood of a misfire.

When using the spark plug 21 of FIG. 3, the spark gap 36 would extend into the path of the fuel plume. However, the screen 39 would extend between the injector and the spark gap and would divert some of the fuel away from the spark gap, as well as improve atomization and vaporization. Thus, an ignitable air-fuel mixture may be provided at the spark gap for enhanced ignitability of the charge. It should be apparent that either screen arrangement could be applied to the differing electrode arrangements of FIGS. 2 and 3 to direct injected fuel toward or away from the spark gap, since either screen would inherently tend to disperse fuel striking the screen. This would tend to enrich air-fuel mixture at a spark gap outside the plume and to reduce the richness of the mixture at a spark gap in the path of the fuel plume.

Figure 5:
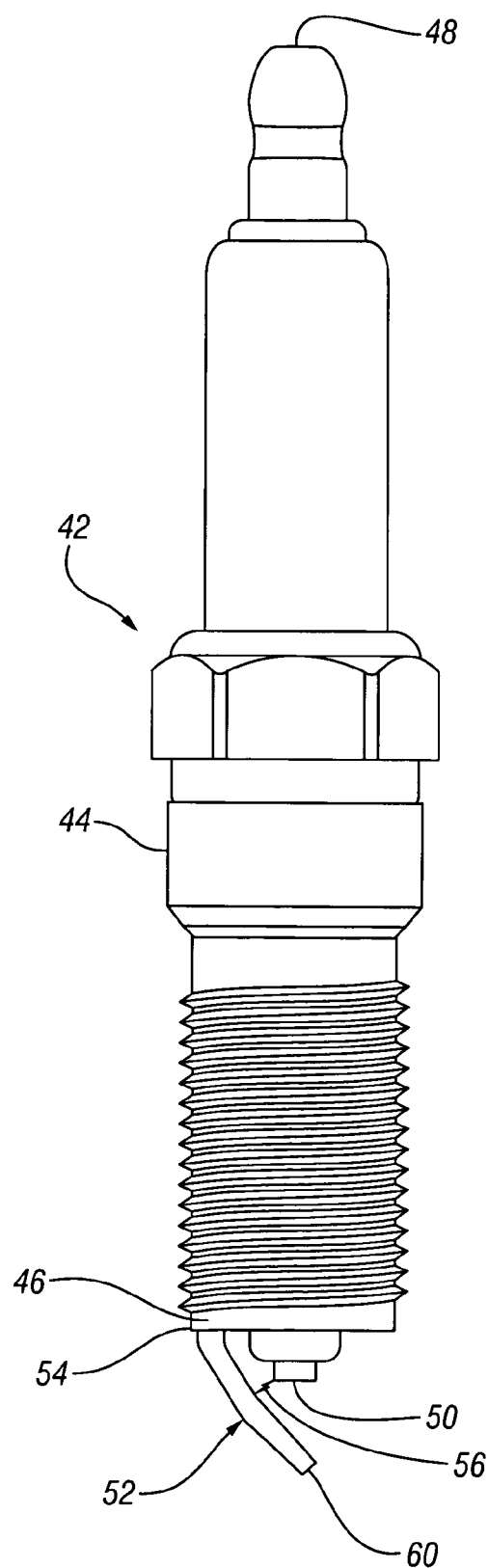
FIG. 5 is a view similar to FIG. 2 showing a second embodiment of the invention.

FIG. 5 shows another embodiment of a spark plug 42, for use in an internal combustion engine. Spark plug 42 includes an axially extending body 44 having first and second ends 46, 48. A central insulated electrode 50 extends from the first end 46 of the body 44. A ground electrode 52 extends from a peripheral edge 54 of the first end, to a point radially adjacent the central electrode 50, to form a spark gap 56, and beyond to an end portion 60 spaced axially from the central electrode. The spark gap 56 is positioned to one side of an adjacent fuel spray plume when the plug is installed in an engine combustion chamber. The end portion 60 extends angularly across and beyond the body 44 to intercept part of the fuel spray plume. As a result, the extended portion 60 forms a diversion element (spark ignition enhancer) which increases fuel spray turbulence and reduces fuel spray velocity, improves fuel atomization and vaporization and directs a portion of the fuel spray toward the spark gap 56.

Figure 6:
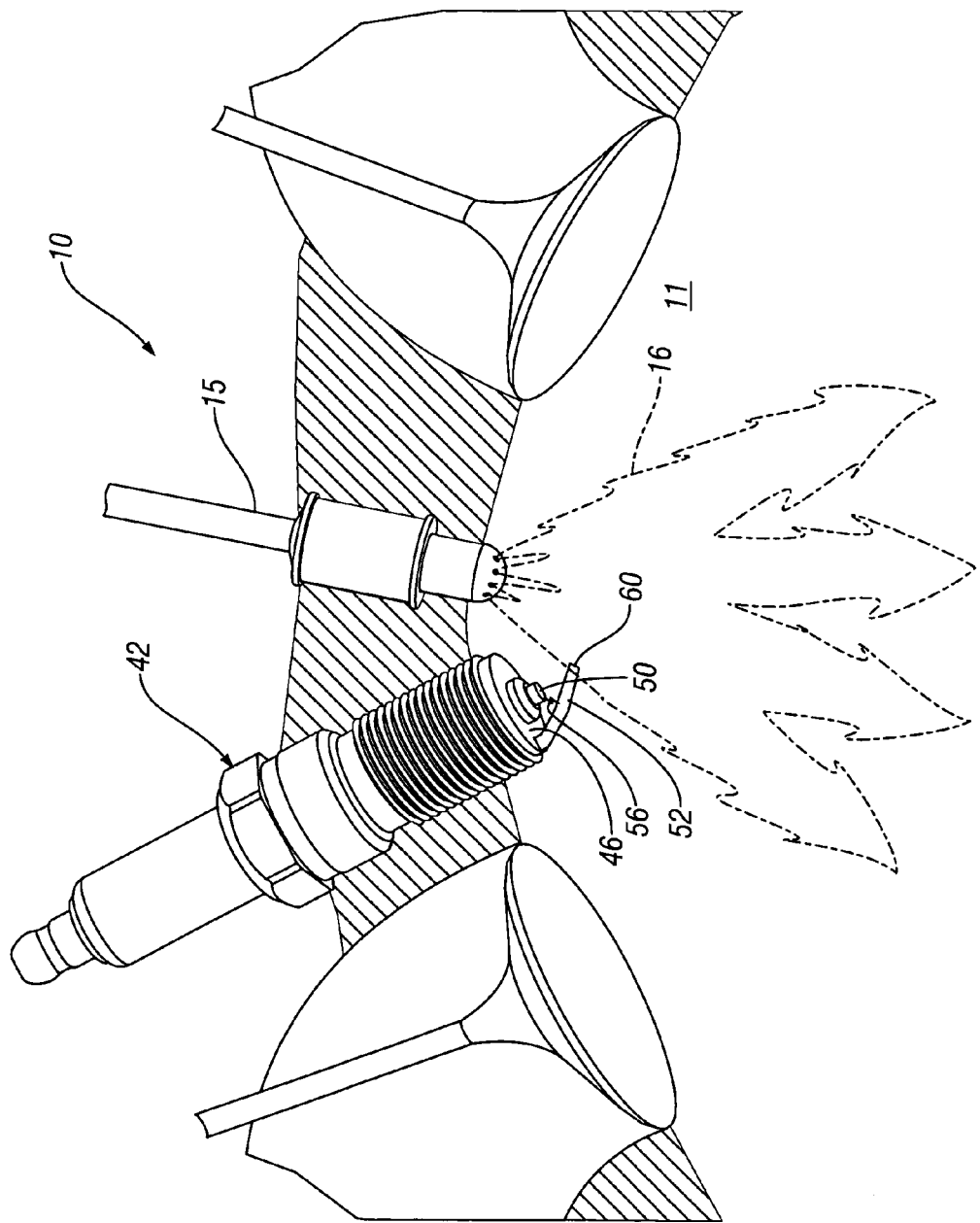
FIG. 6 is a view similar to FIG. 4 but with the spark plug of FIG. 5.

As illustrated in FIG. 6, the spark plug 42 is installed in an engine so that the first end 46 extends into the combustion chamber 11. When the plug is installed, the end portion 60 of the ground electrode 52 is in the fuel spray path and the spark gap 56 is positioned adjacent the fuel spray path. As fuel is sprayed as a fuel spray plume 16 from an injector 15 into the combustion chamber, a portion of the fuel is directed onto the end portion 60 of the ground electrode 52. This fuel is deflected in various directions to create turbulence, which reduces the velocity of the fuel and improves fuel vaporization. A portion of the deflected fuel travels toward the spark gap 56. When the spark plug 42 is energized to form an arc in the spark gap 56, the improved air-fuel mixture at the spark gap easily ignites. This in turn ignites the air-fuel mixture throughout the combustion chamber 11 for improved combustion and reduced likelihood of a misfire.

Figure 7:
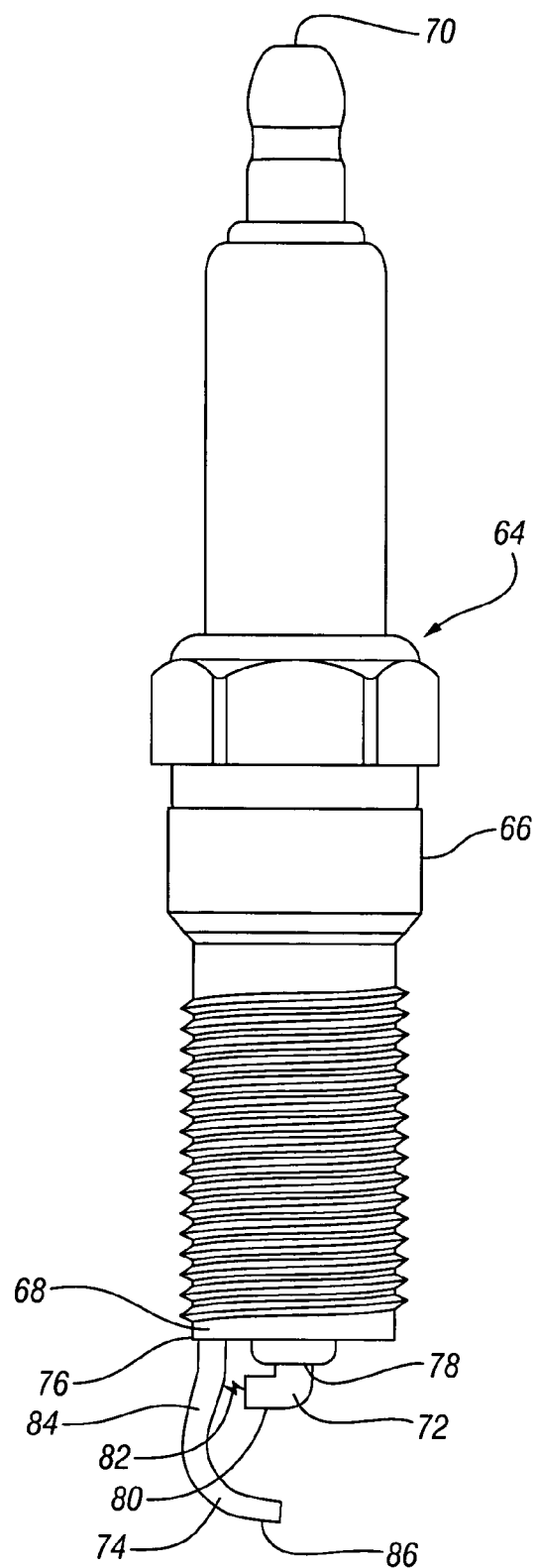
FIG. 7 is a view similar to FIG. 2 showing a third embodiment of the invention.

FIG. 7 shows still another embodiment of a spark plug 64, for use in an internal combustion engine. The spark plug 64 includes an axially extending body 66 having first and second ends 68 and 70. A central insulated electrode 72 extends from the first end 68. A ground electrode 74 extends from a peripheral edge 76 of the first end 68, radially adjacent the central electrode 72. The insulated electrode 72 has an axial portion 78 extending from the first end 68 of the body 66 and a lateral portion 80 bent toward the ground electrode 74 to form a spark gap 82 adjacent the first end of the body.

The ground electrode 74 includes an extended connecting portion 84 joined with the first end 68 of the body 66 and a lateral portion 86 extending from the connecting portion. The connecting portion 84 of the ground electrode 74 extends axially outward from the first end 68, past the lateral portion 86 of the insulated electrode 72, to form the spark gap 82 adjacent a fuel spray plume when the plug is installed in an engine combustion chamber. The lateral portion 86 of the ground electrode is directed radially toward an axis of the body 66 and is adapted to extend into the fuel spray plume. Thus, the lateral portion 86 of the ground electrode 74 forms a diversion element (spark ignition enhancer).

Figure 8:
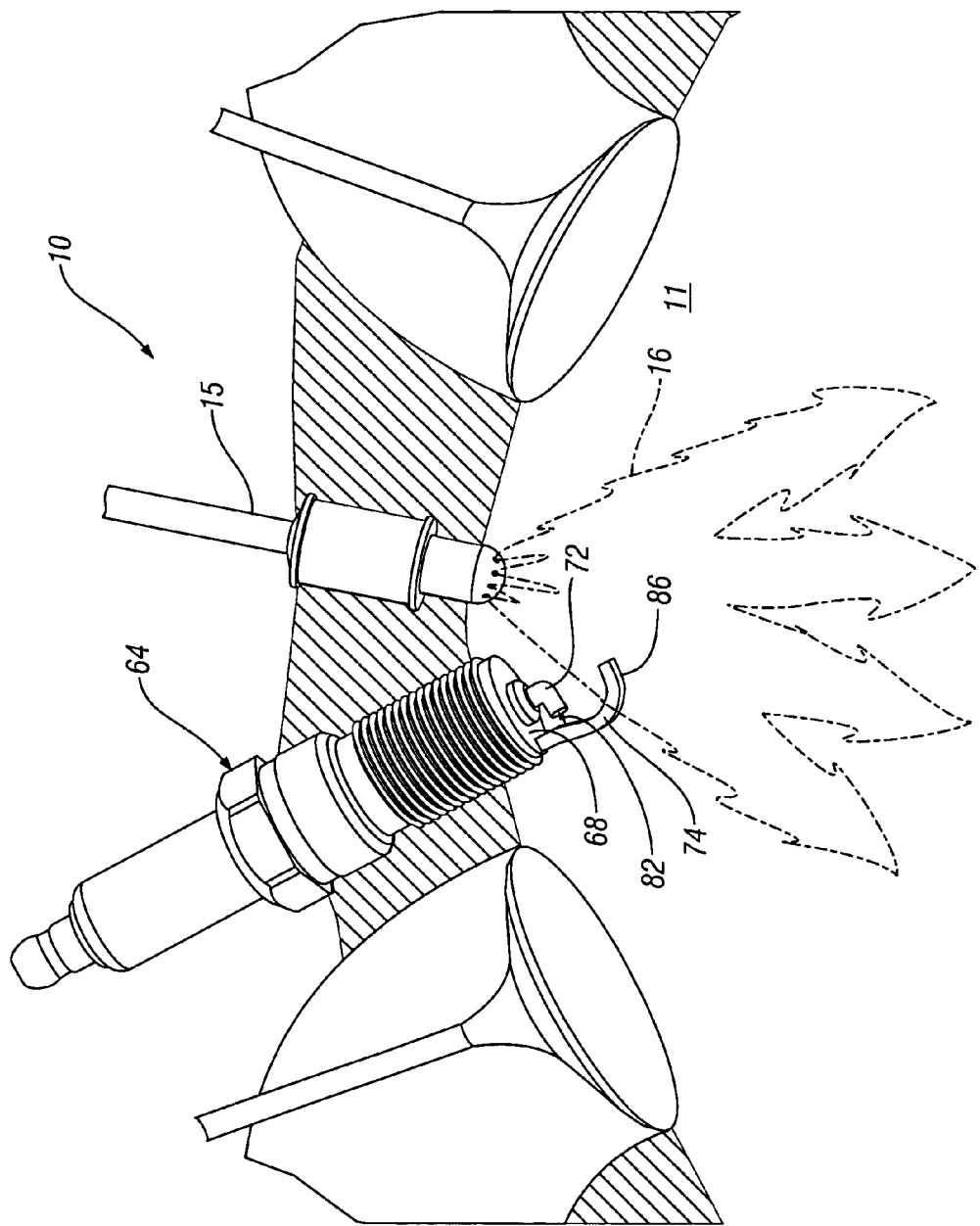
FIG. 8 is a view similar to FIG. 4 but with the spark plug of FIG. 7.

As illustrated in FIG. 8, the spark plug 64 is installed in an engine so that the first end 68 extends into the combustion chamber 11. The plug is installed so that the lateral portion 86 of the ground electrode 74 protrudes into the fuel plume 16 and the spark gap 82 is positioned adjacent the fuel spray path. As fuel is sprayed from an injector 15 into the combustion chamber, a portion of the fuel is directed against the lateral portion 86 of the ground electrode 74. This fuel is deflected in various directions to create turbulence, which reduces the velocity of the fuel spray and improves fuel atomization and vaporization. A portion of the fuel is deflected to the spark gap 82. Thus, when the spark plug 64 is energized to cause an arc in the spark gap 82, the improved air-fuel mixture at the spark gap easily ignites, reducing the likelihood of a misfire.

Tests of spark plugs with an ignition enhancer similar to the embodiment 60 of FIG. 5 in an engine combustion chamber 11 similar to FIG. 1 were conducted with fuel injection timing held constant and spark timing varied from 20 to 60 degrees before piston top dead center. Results showed a substantial increase, compared to conventional spark plugs, in the range of spark timing values that would provide operation with stable ignition, in which there are no misfires and the coefficient of variation in combustion is less than 7 percent.

It should be understood, that a spark ignition enhancer or diversion element, as previously described, could be located elsewhere than on a spark plug. In such a case, a conventional spark plug may be used and the diversion element may be carried on or formed as part of the cylinder head between or adjacent to the fuel injector and the spark plug to improve the air-fuel mixture at the spark gap of the plug for improved ignitibility.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. A combination comprising:
    an engine combustion chamber having direct fuel injection forming a fuel spray plume in the combustion chamber, and
    a spark plug including an insulated electrode and a ground electrode defining a spark gap;
    wherein the spark gap is positioned outside of the fuel spray plume and the ground electrode extends progressively a further distance away from the insulated electrode beyond the spark gap into the spray plume to divert some of the fuel spray toward the spark gap for ignition.

2. A spark plug for an internal combustion engine, the spark plug comprising:
    a body including an insulated electrode and a ground electrode defining a spark gap adapted to be positioned near an edge of a fuel spray plume in an engine combustion chamber;
    wherein the insulated electrode is bent radially toward a base portion of the ground electrode to locate the spark gap out of the direct spray plume and the ground electrode is extended in the direction of the spray plume to deflect a portion of the fuel spray toward the spark gap.

3. A spark plug for an internal combustion engine, the spark plug comprising:
    an axially extending body including a central insulated electrode extending from a first end of the body and a ground electrode extending outward from a peripheral edge of the first end to a point adjacent the central electrode to form a spark gap therewith and the ground electrode continuing progressively a further distance away from the central insulated electrode beyond the spark gap sufficient to extend into a fuel spray plume in an associated engine combustion chamber for directing fuel spray toward the spark gap.

* * * * *